(12) United States Patent
Shibuya et al.

(10) Patent No.: US 6,247,913 B1
(45) Date of Patent: Jun. 19, 2001

(54) MOLDING MACHINE

(75) Inventors: Hiroshi Shibuya; Satoshi Nishida; Tokuzou Sekiyama; Satoru Matsubara, all of Gunma; Atsushi Koide, Nagano, all of (JP)

(73) Assignees: Nissei Plastic Industrial Co., Ltd., Nagano-Ken; Nisso Electric Company, Gunma-Pref, both of (JP)

( * ) Notice: Subject to any disclaimer, the term of this patent is extended or adjusted under 35 U.S.C. 154(b) by 0 days.

(21) Appl. No.: 09/301,761

(22) Filed: Apr. 29, 1999

(30) Foreign Application Priority Data

May 1, 1998 (JP) .................................................. 10-122228

(51) Int. Cl.[7] .................................................. B29C 45/80

(52) U.S. Cl. .......................... 425/145; 425/557; 425/576

(58) Field of Search .................................. 425/149, 145, 425/150, 576, 562, 557

(56) References Cited

U.S. PATENT DOCUMENTS

| | | | |
|---|---|---|---|
| 5,518,394 | * | 5/1996 | Shiozawa et al. .................... 425/562 |
| 5,891,485 | * | 4/1999 | Emoto .................................. 425/542 |
| 6,024,558 | * | 2/2000 | Looije et al. ........................ 425/576 |

FOREIGN PATENT DOCUMENTS 9-11290   1/1997  (JP) .

\* cited by examiner

*Primary Examiner*—Tim Heitbrink
(74) *Attorney, Agent, or Firm*—Birch, Stewart, Kolasch & Birch, LLP

(57) ABSTRACT

A molding machine includes a drive unit which, in turn, includes comprises a rotary motor and a thrust generator. The rotary motor includes a shaft which is rotatable and axially movable. The shaft is connected to a movable body so as to rotate the movable body by the rotary motor and to reciprocate the movable body by the thrust generator. Thus, the drive unit is substantially composed of a single rotary motor which functions for rotating and reciprocating the movable body, such as a screw.

16 Claims, 12 Drawing Sheets

MOLDING MACHINE

BACKGROUND OF THE INVENTION

1. Field of the Invention

The present invention relates to a molding machine having a drive unit for rotating and reciprocating a movable body, such as a screw.

2. Description of the Relevant Art

An in-line screw injection molding machine equipped with a motor drive unit for rotating and reciprocating a screw is disclosed in, for example, Japanese Patent Application Laid-Open (kokai) No. 9 (1997)-11290.

Such an injection molding machine includes a measurement-related drive section, which employs a first servomotor and is adapted to rotate a screw, and an injection-related drive section, which employs a second servomotor and is adapted to reciprocate the screw. In a measuring step, the measurement-related drive section causes the screw to rotate, thereby plasticizing and measuring a molding material. In an injection step, the injection-related drive section causes the screw to advance, thereby injecting and charging the measured resin into a mold. Many molding machines employ a drive unit for driving a movable body, such as a screw, in two different operation modes as mentioned above.

However, since such a drive unit employs one servomotor for each drive section, as many servomotors as drive sections are required. Further, the drive section for reciprocating the movable body requires not only a servomotor but also a motion conversion mechanism, such as a ball screw mechanism, in order to convert the rotational motion of the servomotor to a linear motion. As a result, due to an increase in the number of components, the overall structure of an injection molding machine becomes complicated and increases in size, resulting in an impairment in reliability and a great increase in overall cost.

SUMMARY OF THE INVENTION

An object of the present invention is to provide a molding machine which may be a preplasticization injection molding machine, an in-line screw injection molding machine, or a molding machine having a rotary table mechanism and which can reduce the number of components, while simplifying and downsizing the overall structure.

Another object of the present invention is to provide a molding machine capable of improving reliability and achieving great cost reduction.

To achieve the above objects, a molding machine of the present invention comprises a drive unit which, in turn, comprises a rotary motor and a thrust generator. The shaft of the rotary motor can be moved in the axial direction by the thrust generator. The shaft is connected to a movable body so as to rotate the movable body by the rotary motor and to reciprocate the movable body by the thrust generator.

Since the thrust generator is incorporated into the rotary motor, the structure and size of the drive unit become substantially equal to those of a single rotary motor, so that the structure of the drive unit can be simplified and the size of the drive unit can be decreased.

DETAILED DESCRIPTION OF THE PREFERRED EMBODIMENTS

Embodiments of the present invention will next be described in detail with reference to the drawings. The accompanying drawings are illustrative of the embodiments and are not meant to limit the scope of the invention. In order to clarify the invention, detailed description of known parts is omitted.

A molding machine according to a first embodiment, i.e., an in-line screw injection molding machine Ma, will be described with reference to FIGS. 1 to 7.

Figure 1:
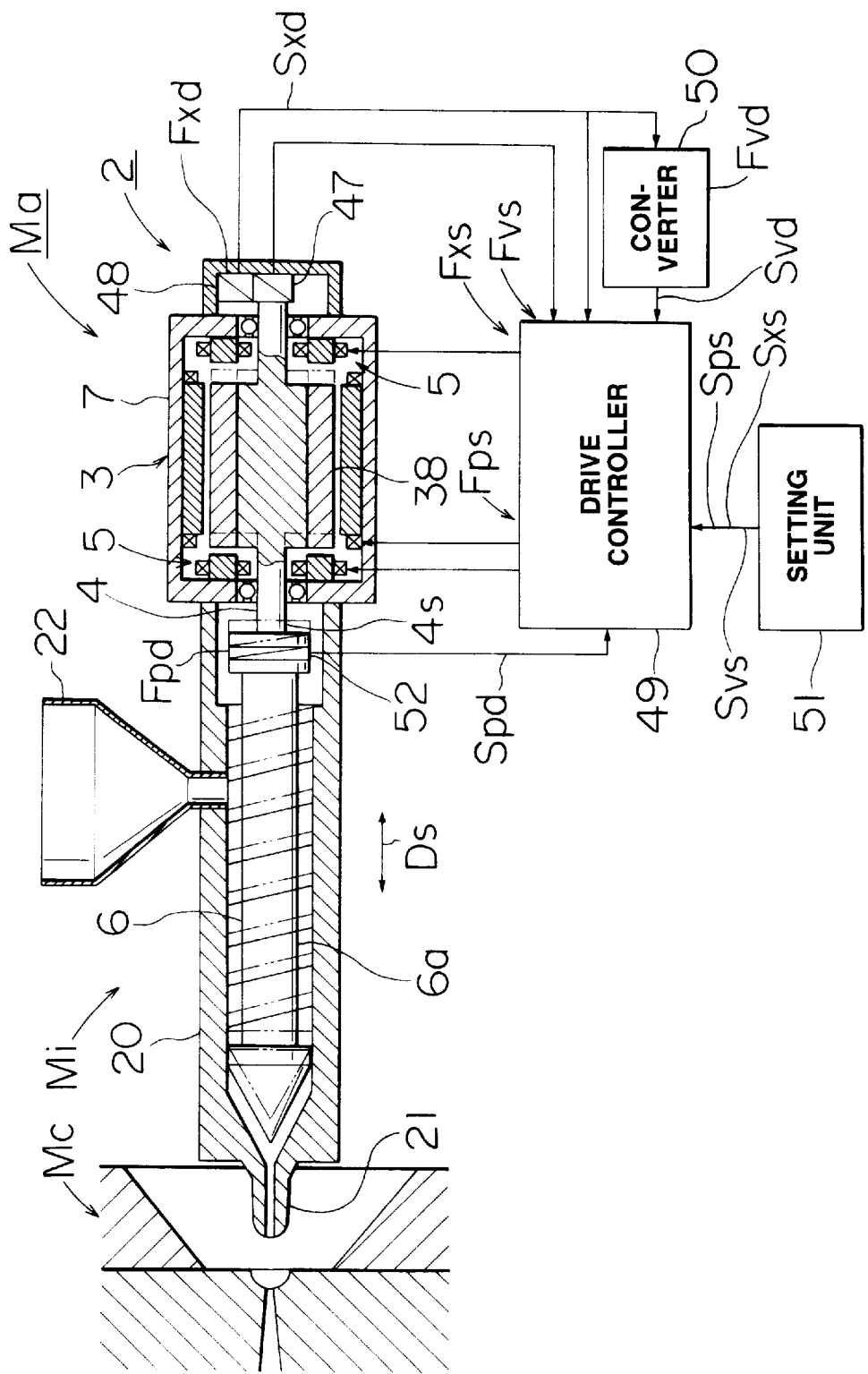
FIG. 1 is a schematic view showing a molding machine (in-line screw injection molding machine) according to a first embodiment of the present invention.

The in-line screw injection molding machine Ma of FIG. 1 includes a clamping mechanism Mc equipped with a mold and an injection mechanism Mi. The injection mechanism Mi includes a heating cylinder 20 having an injection nozzle 21 located at the tip thereof and a hopper 22 located at a rear (right-hand side in FIG. 1) portion. A screw 6a (movable body 6) is inserted into the heating cylinder 20 such that it can undergo rotation and reciprocating motion therein. A drive unit 2 is provided at the rear end of the heating cylinder 20. An output shaft portion 4s of the drive unit 2 is connected to the rear end of the screw 6a.

Figure 2:
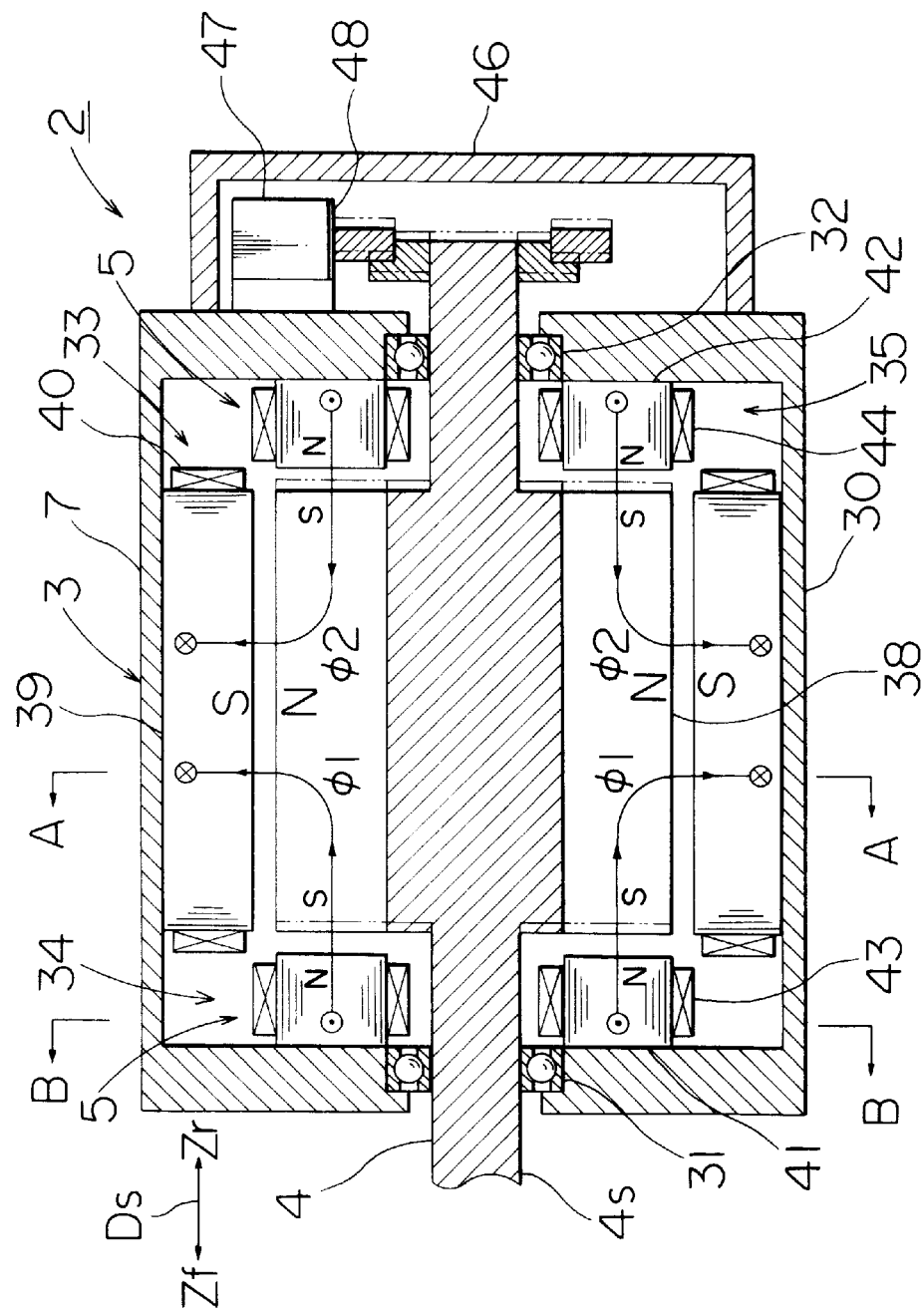
FIG. 2 is a sectional side view of a drive unit provided in the molding machine of FIG. 1.
Figure 3:
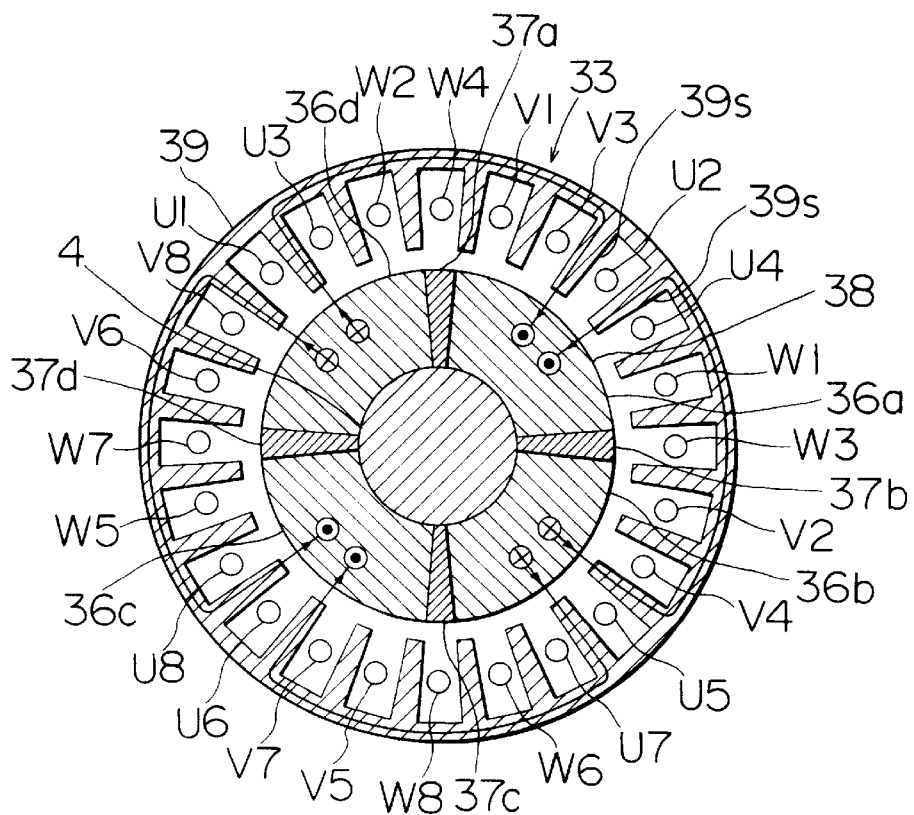
FIG. 3 is a sectional view taken along line A—A of FIG. 2.

The drive unit 2 includes a rotary motor 3 which, in essence, is a four-pole three-phase synchronous motor. As shown in FIG. 2, the rotary motor 3 includes a cylindrical stator frame 30 (casing 7). Bearings 31 and 32 provided on the stator frame 30 support a shaft 4 such that the shaft 4 is rotatable and movable (slidable) in the axial direction Ds. An armature portion 33 is disposed within the stator frame 30 along the inner circumferential surface thereof. Field portions 34 and 35 are disposed within the stator frame 30 such that the field portion 34 is located inside the front (left-hand side in FIG. 1) end surface of the stator frame 30 and the field portion 35 is located inside the rear end surface of the stator frame 30. As shown in FIG. 3, the shaft 4 has a rotor portion 38 that includes magnetic elements 36a to 36d and non-magnetic elements 37a to 37d. A front end portion of the shaft 4 is the output shaft portion 4s.

Figures 5A, 5B:
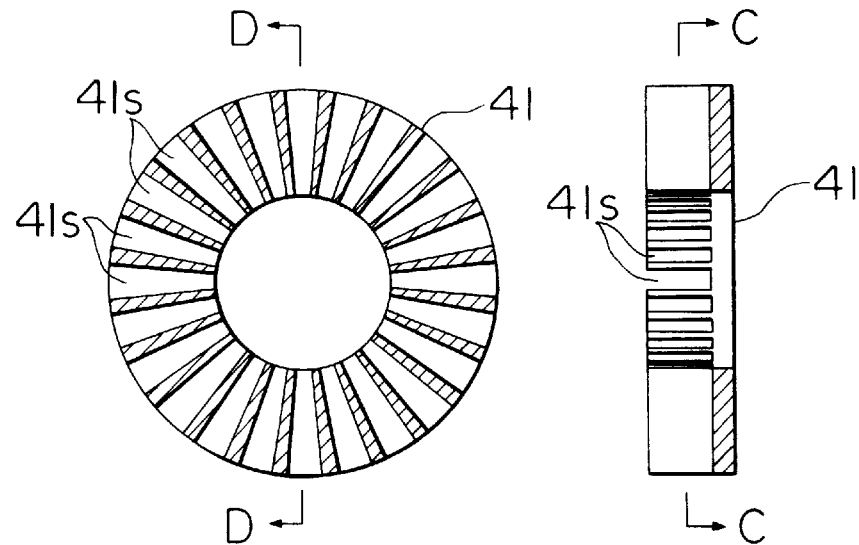
FIG. 5(a) is a sectional view of a field core that constitutes the field portion of the drive unit of FIG. 2, taken along line C—C of FIG. 5(b)
FIG. 5(b) is a sectional view of the field core taken along line D—D of FIG. 5(a)

As shown in FIG. 3, the armature portion 33 includes an armature core 39 having 24 slots 39s formed therein. Three-phase armature coils 40 (see FIG. 2) are sequentially wound around the armature core 39 along the slots 39s. The field portions 34 and 35 include field cores 41 and 42, respectively. As shown in FIGS. 5(a) and 5(b), the field core 41 (42) has 24 slots 41s formed therein. Three-phase field coils 43 (see FIG. 2) are sequentially wound around the field core 41 along the slots 41s. Reference numerals 44 denote three-phase field coils wound around the field core 42.

The armature coils 40 of the armature portion 33 are divided into U-phase coils, V-phase coils, and W-phase coils, each being positionally shifted so as to establish a shift of 120° with respect to electrical angle. Specifically, the U-phase coils are wound along eight slots 39s in the sequence of coil U1 through coil U8. The V-phase coils are wound along eight slots 39s in the sequence of coil V1 through coil V8. The W-phase coils are wound along eight slots 39s in the sequence of coil W1 through coil W8. A shift of an electrical angle of 120° is established between the U-phase coils and the V-phase coils and between the V-phase coils and the W-phase coils. In other words, as shown in FIG. 3, the U-phase coils are shifted clockwise from the corresponding V-phase coils by four slots 39s, and the V-phase coils are shifted clockwise from the corresponding W-phase coils by four slots 39s, thereby establishing a shift of 120° between coils.

As in the case of the armature coils 40, the field coils 43 of the field portion 34 are divided into u-phase coils, v-phase coils, and w-phase coils, which are positionally shifted so as to establish a shift of 120° with respect to electrical angle. Specifically, the u-phase coils include a coil extending between winding terminal ua and winding terminal ub along four slots 41s, and a coil extending between winding terminal uc and winding terminal ud along four slots 41s. The v-phase coils include a coil extending between winding terminal va and winding terminal vb along four slots 41s, and a coil extending between winding terminal vc and winding terminal vd along four slots 41s. The w-phase coils include a coil extending between winding terminal wa and winding terminal wb along four slots 41s and a coil extending between winding terminal wc and winding terminal wd along four slots 41s. The field coils 44 of the field portion 35 are wound symmetrically with the field coils 43 in a manner similar to that of the field coils 43.

The field coils 43 (44) of the field portion 34 (35) are wound in such a manner as to shift from the armature coils 40 by an electrical angle of 90°. Specifically, the u-phase coils of the field coils 43 (44) are shifted clockwise from the corresponding U-phase coils of the armature coils 40 by three slots 41s (42s), which corresponds to an electrical angle of 90°. For the rotary motor 3 of a certain structure, the angle of shift is not necessarily an exact electrical angle of 90°, but may be an electrical angle near 90°.

The rotor portion 38 assumes a cylindrical form and is integrally provided on the shaft 4. The rotor portion 38 includes four magnetic elements 36a to 36d and four non-magnetic elements 37a to 37d, which extend along the direction of magnetic flux (along axis of rotation) generated from the magnetic poles (north and south poles) of the field portions 34 and 35. The magnetic elements 36a to 36d are circumferentially separated from each other by the interposed non-magnetic elements 37a to 37d, thereby preventing magnetic coupling thereof. The magnetic elements 36a to 36d are magnetically coupled with the armature core 39 at outer circumferential surfaces and with the field cores 41 and 42 at opposite end faces. The thickness of the non-magnetic elements 37a to 37d in the circumferential direction is about 3 mm to 10 mm. A gap of about 0.5 mm to 10 mm is formed between the magnetic elements 36a to 36d and the armature core 39 or the field cores 41 and 42. Since the magnetic elements 36a to 36d are magnetically separated from each other by the non-magnetic elements 37a to 37d, magnetic flux emitted from the north poles of the field portions 34 and 35 readily enters the armature portion 33 via the magnetic elements 36a to 36d. The magnetic elements 36a to 36d may be formed from an iron material, an iron-nickel alloy, a powder magnetic core, or ferrite.

The thus-configured rotary motor portion 3 operates in the following manner. First, alternating currents iu, iv, and iw, which are shifted by a phase angle of 120°, flow through the field coils 43 of the field portion 34. When im represents a maximum current, iu, iv, and iw are represented as follows: $iu = im \cdot \sin\omega t$; $iv = im \cdot \sin(\omega t - 2\pi/3)$; and $iw = im \cdot \sin(\omega t - 4\pi/3)$. As a result of alternating currents iu, iv, and iw flowing through the field coils 43, a magnetic pole (north pole) for generating magnetic flux directed toward the magnetic elements 36b and 36d of the rotor portion 38 is induced, and a magnetic pole (south pole) for absorbing magnetic flux directed from the magnetic elements 36a and 36c toward the field portion 34 is induced. The thus-induced magnetic poles cause magnetic poles to emerge on the end face of the rotor portion 38 opposite the field portion 34 and to rotate clockwise. Alternating currents iu, iv, and iw also flow through the field coils 44 of the field portion 35. As a result, magnetic poles (north and south poles) identical to those that emerge in the case of the field portion 34 emerge on the end face of the rotor portion 38 opposite the field portion 35 and rotate in the same direction as do those that emerge in the case of the field portion 34.

In the magnetic field associated with the magnetic poles (north and south poles) induced by the field coils 43 and 44, magnetic flux is distributed in the form of a sine wave along the direction of rotation. When the maximum magnetic flux is represented by $\Phi m$ and the center of the magnetic pole is located at $\theta = 0$, magnetic flux is represented by $\Phi = \Phi m \cdot \cos\theta$. By aligning the magnetic-pole center of the magnetic field induced by the field coils 43 and 44 with the most readily magnetizable surface of the rotor portion 38 through control of alternating currents iu, iv, and iw flowing through the field coils 43 and 44, the rotor portion 38 is magnetized in a predetermined direction and at a magnetic flux density approximated by $B = Bm \cdot \cos\theta$.

Specifically, the magnetic elements 36a to 36d of the rotor portion 38 are magnetized in predetermined directions according to magnetic poles (north and south poles) induced in the field portions 34 and 35. For example, as shown in FIG. 2, when alternating currents iu, iv, and iw flowing through the field coils 43 and 44 cause the north poles to be induced in the field portions 34 and 35 at portions opposite the magnetic elements 36b and 36d and cause the south poles to be induced in the field portions 34 and 35 at portions opposite the magnetic elements 36a and 36c, the south poles are induced in the magnetic elements 36b and 36d at end faces opposite the field portions 34 and 35, and the north poles are induced in the magnetic elements 36a and 36c at end faces opposite the field portions 34 and 35. Further, the north poles are induced in the magnetic elements 36b and 36d at outer circumferential surfaces opposite the armature portion 33, and the south poles are induced in the magnetic elements 36a and 36c at outer circumferential surfaces opposite the armature portion 33.

Further specifically, magnetic flux Φ1 induced from the two north poles of the field portion 34 passes through the south-pole end faces of the magnetic elements 36b and 36d and reaches the interior thereof. Similarly, magnetic flux Φ2 induced from the two north poles of the field portion 35 passes through the south-pole end faces of the magnetic elements 36b and 36d and reaches the interior thereof. Then, magnetic fluxes Φ1 and Φ2 pass through the north-pole outer circumferential surfaces of the magnetic elements 36b and 36d and reaches the armature portion 33. The magnetic fluxes Φ1 and Φ2 further extend from the armature portion 33 to the interior of the magnetic elements 36a and 36c through the south-pole outer circumferential surfaces thereof. Then, the fluxes Φ1 and Φ2 pass through the north-pole end faces of the magnetic elements 36a and 36c and reaches the south-pole end faces of the field portions 34 and 35.

As described above, in the rotary motor 3, the field portions 34 and 35, the rotor portion 38, and the armature portion 33 form a predetermined magnetic closed circuit. The magnetic flux Φ1 (Φ2) induced from the field portion 34 (35) causes an attractive force to be generated between the opposite faces of the magnetic elements 36a to 36d and the field portion 34 (35). The magnitude of the attractive force depends on the magnitude of the magnetic flux Φ1 (Φ2). Accordingly, when the magnitude of the magnetic flux Φ1 induced by the field portion 34 is equal to that of the magnetic flux Φ2 induced by the field portion 35, an attractive force associated with the magnetic flux Φ1 and that associated with the magnetic flux Φ2 cancel each other. As a result, only torque that depends on the magnetic flux Φ1 and the magnetic flux Φ2 is generated in the rotary motor 3.

Alternating currents IU, IV, and IW, which are shifted by a phase angle of 120°, flow through the armature coils 40 of the armature portion 33. When Im represents a maximum current, IU, IV, and IW are represented as follows: IU=Im·sinωt; IV=Im·sin(ωt−2π/3); and IW=Im·sin(ωt−4π/3). Since the armature coils 40 lead the field coils 43 and 44 in phase by an electrical angle of about 90°, torque is generated according to Fleming's rule, so that the rotor portion 38 (shaft 4) rotates. The magnitude of torque can be controlled simply by controlling the magnitude of current flowing through the field coils 43 and 44 and the armature coils 40. Notably, armature current also induces magnetic flux. However, since the magnetic resistance of the rotor portion 38 is set large in the direction of the magnetic flux, the rotor portion 38 is less likely to be magnetized; i.e., the rotor portion 38 is less affected by the magnetic flux.

When the magnitude of the magnetic flux Φ1 induced by the field portion 34 differs from that of the magnetic flux Φ2 induced by the field portion 35, a thrust can be exerted on the rotor portion 38 in axial direction Ds according to the difference in magnitude between the magnetic flux Φ1 and the magnetic flux Φ2. Specifically, when the magnitude of the magnetic flux Φ1 induced by the field portion 34 is smaller than that of the magnetic flux Φ2 induced by the field portion 35, a thrust is exerted on the rotor portion 38 in the Zf direction. By contrast, when the magnitude of the magnetic flux Φ1 induced by the field portion 34 is greater than that of the magnetic flux Φ2 induced by the field portion 35, a thrust is exerted on the rotor portion 38 in the Zr direction.

The magnitude of the thrust depends on the differential between field current IfL supplied to the field portion 34 and field current IfR supplied to the field portion 35. Accordingly, through control of the magnitude of field currents IfL and IfR, thrust (pressure) in axial direction Ds can be controlled. Also, through control of the magnitude of field currents IfL and IfR, the magnitude of rotational torque can be controlled, or the magnitude of thrust can be controlled while rotational torque is held constant. In the latter case, the magnitude of the magnetic flux Φ1 and the magnitude of the magnetic flux Φ2 may be controlled while the sum thereof is held constant. As seen from the above description, the field portions 34 and 35 also serve as a thrust generator 5 for moving the shaft 4 in axial direction Ds.

A control system for the thrust generator 5 will next be described. A rear cover 46 is provided on the rear end face of the stator frame 30. The rear cover 46 houses a rotary encoder 47 for detecting the rotational position (rotational speed) of the shaft 4 and a linear scale 48 for detecting the axial position of the shaft 4. The rotary encoder 47 and the linear scale 48 are connected to a drive controller 49. The linear scale 48 serves as a position detection unit Fxd for detecting the axial position of the screw 6a (shaft 4). The linear scale 48 supplies a detected position value Sxd to the drive controller 49. The detected position value Sxd is also supplied to a speed converter 50. The speed converter 50 serves as a speed detection unit Fvd for detecting an reciprocating speed of the screw 6a by differentiating the detected position value Sxd with respect to time. The speed detection unit Fvd supplies a detected speed value Svd to the drive controller 49. A pressure sensor 52 serving as a pressure detection unit Fpd is interposed between the screw 6a and the output shaft portion 4s. The pressure sensor 52 supplies a detected pressure value Spd to the drive controller 49. A setting unit 51 supplies the drive controller 49 a preset position value Sxs, a preset speed value Svs, and a preset pressure value Sps.

The drive controller 49 includes a position control unit Fxs, a speed control unit Fvs, and a pressure control unit Fps. The position control unit Fxs controls the thrust generator 5 on the basis of the detected position value Sxd and the preset position value Sxs so as to control the position of the screw 6a. The speed control unit Fvs controls the thrust generator 5 on the basis of the detected speed value Svd and the preset speed value Svs so as to control the speed of the screw 6a. The pressure control unit Fps controls the thrust generator 5 on the basis of the detected pressure value Spd and the preset pressure value Sps so as to control the pressure of the screw 6a. Accordingly, the drive controller 49 controls the magnitude of field currents IfL and IfR of the field portions 34 and 35 on the basis of a deviation of the detected position value Sxd from the preset position value Sxs, thereby performing feedback control with respect to position so that the position of the screw 6a in the reciprocating direction (axial direction Ds) coincides with the position represented by the preset position value Sxs. The drive controller 49 controls the magnitude of field currents IfL and IfR of the field portions 34 and 35 on the basis of a deviation of the detected speed value Svd from the preset speed value Svs, thereby performing feedback control with respect to speed so that the moving speed of the screw 6a in the reciprocating direction coincides with the speed represented by the preset speed value Svs. The drive controller 49 controls the magnitude of field currents IfL and IfR of the field portions 34 and 35 on the basis of a deviation of detected pressure value Spd from the preset pressure value Sps, thereby performing feedback control with respect to pressure so that the pressure (thrust) of the screw 6a in the reciprocating direction coincides with the pressure represented by the preset pressure value Sps.

As described above, with no need for adding a particular component for generation of thrust, the drive controller 2 can concurrently control torque and thrust through control of the magnitude of field currents IfL and IfR of the field portions 34 and 35, which control the rotational torque. Since the drive unit 2 is substantially composed of a single rotary motor 3, the structure of the drive unit 2 is significantly simplified. Thus, through a reduction in the number of components, the structure of the drive unit 2 becomes simple and compact, thereby achieving an improvement in reliability and a great reduction in cost.

Figure 6:
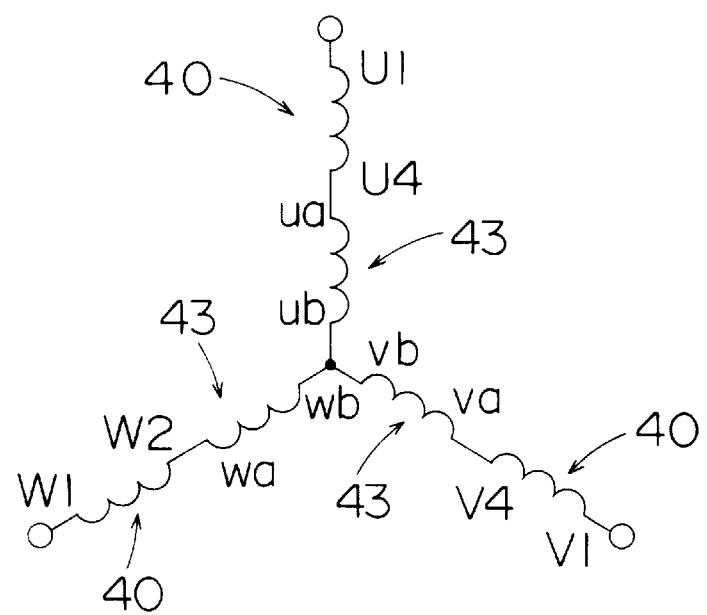
FIG. 6 is a connection diagram of armature coils and field coils in the drive unit of FIG. 2.

FIG. 6 shows how the armature coils 40 and the field coils 43 (44) are connected. When the field coils 43 (44) and the armature coils 40 are mechanically wound such that there exists a phase difference of 90° in electrical angle therebetween, the armature coils 40 and the field coils 43 (44) can be series-wound. The drive unit 2, therefore, can be controlled as a series-wound AC motor by a single inverter. In this case, the field coils 43 (44) are provided with additional coils for controlling thrust. By controlling the magnitude of field current supplied to the field coils 43 and that of field current supplied to the field coils 44, a desired thrust can be generated. When the field coils 43 (44) and the armature coils 40 are wound in a mechanically separate manner so as to assume the same phase, separate inverters may be provided so as to establish a phase difference of 90° between field current and armature current. In this case, by separately controlling the magnitude of field current supplied to the field coils 43 and that of field current supplied to the field coils 44, a desired thrust can be generated.

Figure 7:
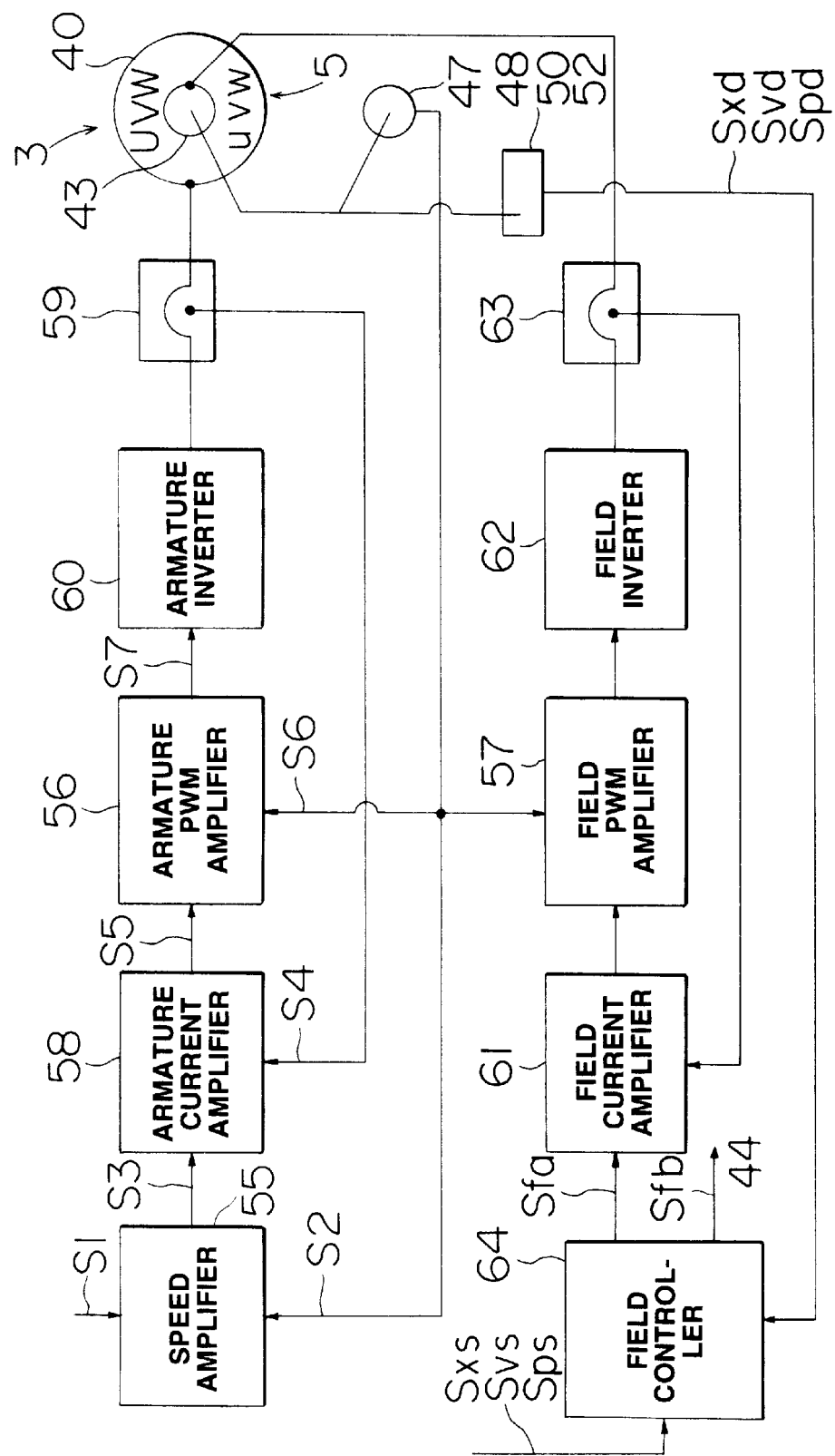
FIG. 7 is a block diagram of an AC servomotor system serving as the drive unit of FIG. 2.

FIG. 7 shows a specific configuration of the drive controller 49, i.e., a block diagram of an AC servomotor system that employs the rotary motor 3. In this case, the field coils 43 (44) and the armature coils 40 are wound in a mechanically separate manner so as to assume the same phase, and field current and armature current between which a phase difference of 90° exists are respectively supplied to the field coils 43 (44) and the armature coils 40.

The rotary encoder 47 sends a speed amplifier 55 a detection signal S2 indicative of the rotational speed (rotational position) of the shaft 4 and sends an armature PWM (pulse width modulation) amplifier 56 and a field PWM amplifier 57 a magnetic-pole position signal S6 indicative of a magnetic-pole position, i.e., the rotational position of the field portion 34 (35) obtained from the detection signal S2. The speed amplifier 55 obtains a deviation of the detection signal S2 from a rotational-speed setting signal S1 and sends an armature current amplifier 58 an armature current instruction signal (torque signal) S3 corresponding to the obtained speed deviation. The armature current amplifier 58 sends the armature PWM amplifier 56 an input signal S5 indicative of an amplified differential between a current feedback signal (detected U-phase current and detected V-phase current) S4 received from a current detection isolator 59 and the armature current instruction signal S3 received from the speed amplifier 55. The armature PWM amplifier 56 sends an armature inverter 60 a three-phase PWM signal, i.e., an inverter control signal S7, on the basis of the input signal S5 received from the armature current amplifier 58 and the magnetic-pole position signal S6. The armature inverter 60 is driven by the inverter control signal S7 in order to supply armature current to armature coils of each phase of the rotary motor 3.

A field current control system assumes a configuration similar to that of the armature current control system except that the speed amplifier 55 is omitted. Specifically, the field current control system includes a field current amplifier 61, a field PWM amplifier 57, a field inverter 62, a field current detection isolator 63, and field controller 64. A portion of the field current control system of FIG. 7 subsequent to the field controller 64 is provided for field coils on one side. The same portion of the field current control system is also provided for field coils on the other side. The field controller 64 receives the detected position value Sxd from the linear scale 48, the detected speed value Svd from the speed converter 50, and the detected pressure value Spd from the pressure sensor 52. The field controller 64 further receives the preset position value Sxs, the preset speed value Svs, and the preset pressure value Sps. During position control, speed control, or pressure control, the field controller 64 outputs field current instruction signals Sfa and Sfb for the field coils 43 and 44. Specifically, the field controller 64 sends a field current instruction signal Sfa to the field current amplifier 61 of the control system for exciting the field coils 43 and sends a field current instruction signal Sfb to a field current amplifier (not shown) of the control system for exciting the field coils 44, thereby systematically controlling the two control systems.

Through employment of the AC servomotor system of FIG. 7, the rotary motor 3 operates as an AC servomotor, so that the rotary motor 3 can be rotated at a desired speed. Also, the rotary motor 3 can be moved in axial direction Ds under a predetermined thrust. The detection of rotational position of the shaft 4 and control of the phases of three-phase field currents are performed such that the magnetic-pole center of the shaft 4 coincides with the magnetic-field center of a rotating magnetic field, irrespective of the axial position of the shaft 4.

The in-line screw injection molding machine Ma equipped with the above-described drive unit 2 operates in the following manner. In a measuring step, the rotary motor 3 causes the screw 6a to rotate such that a predetermined amount of molding material (resin) is supplied from the hopper 22 into the heating cylinder 20 and is plasticized therein. In an injection step, the thrust generator 5 causes the screw 6a to advance so that the measured resin is injected into a mold. In the case of the above-described drive unit 2, the stroke of the screw 6a in axial direction Ds is limited; thus, the drive unit 2 can be applied to molding of small-sized articles. Position control, speed control, and pressure control of the screw 6a in a molding step can be performed according to respectively known processes.

Figure 8:
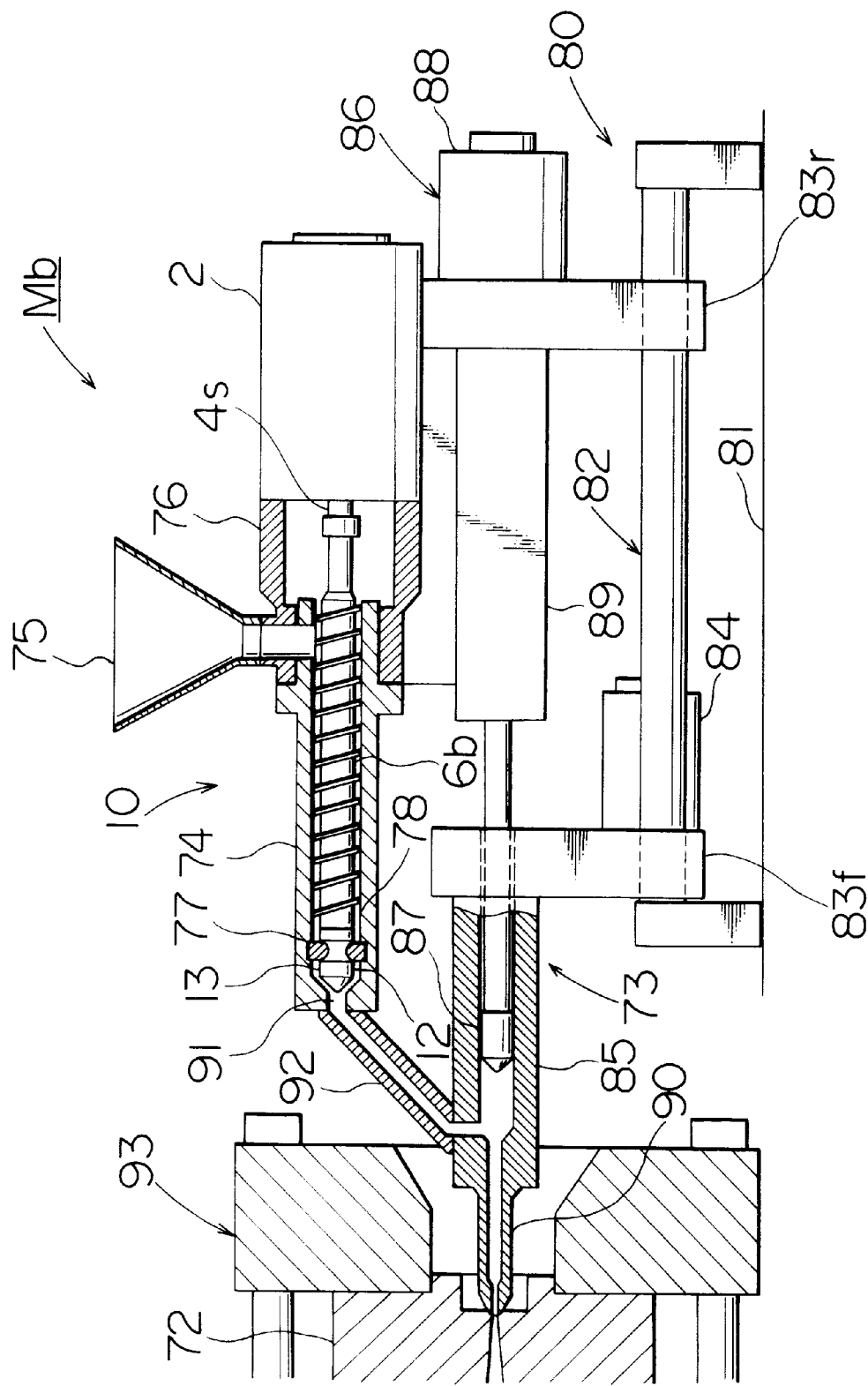
FIG. 8 is a partially sectional view showing a molding machine (preplasticization injection molding machine) according to a second embodiment of the present invention.

Next, a preplasticization injection molding machine Mb according to a second embodiment of the present invention will be described with reference to FIG. 8.

The preplasticization injection molding machine Mb has, as independent units, a plasticizing unit 10 for plasticizing and melting a molding material, and an injection unit 73 for injecting and charging melted resin into a mold 72.

The plasticizing unit 10 includes a heating cylinder 11, and a hopper 75 is provided at the rear portion of the heating cylinder 11. The rear end of the heating cylinder 11 is coupled to the front end of the drive unit 2 (FIG. 2) via a machine body 76. Further, a screw 6b (movable body 6) is inserted into the interior of the heating cylinder 11, and the rear end of the screw 6b is coupled to the front end of the shaft 4, i.e., the output shaft portion 4s, of the drive unit 2. Thus is constructed the drive unit 2 for rotating and reciprocating the screw 6b.

Meanwhile, a circumferentially extending annular groove 77 is formed at the front end portion of the screw 6b in order to provide a valve portion 13 on the front side of the groove 77. Further, an annular valve seat member 78 is attached to the inner circumferential surface of the heating cylinder 11 such that the valve seat member 78 extends from the inner circumferential surface of the heating cylinder 11 to enter the annular groove 77. When the screw 6b is moved rearward until the valve portion 13 abuts the valve seat member 78, a resin passage 12 within the heating cylinder 11 is shut off. When the screw 6b is advanced from that position by a few millimeters, the valve portion 13 separates from the valve seat member 78, so that the resin passage 12 is opened.

The injection unit 73 is supported by a molding machine moving unit 80. The molding machine moving unit 80 includes a tie-bar mechanism 82 disposed on the top surface of a machine base 81, and front and rear support plates 83f and 83r supported on the tie-bar mechanism 82 to be movable in the front/rear direction. The support plates 83f and 83r are advanced and retracted by a drive mechanism 84. The injection unit 73 has an injection cylinder 85 and a plunger drive mechanism 86. The injection cylinder 85 is attached to the front surface of the front support plate 83f and projects forward. The plunger drive mechanism 86 is attached to the rear support plate 83r. An injection plunger 87 is inserted into the injection cylinder 85, and the rear end of the injection plunger 87 is coupled to the plunger drive mechanism 86. The plunger drive mechanism 86 includes a motor 88 and a ball screw mechanism 89 which converts rotational motion output from the motor 88 into linear motion in order to move the injection plunger 87 in the front/rear direction. Instead of the ball screw mechanism 89, another type of mechanism having the same function, such as a roller screw mechanism or an air drive mechanism, may be used for moving the injection plunger 87 in the front/rear direction.

The injection cylinder 85 has an injection nozzle 90 at its front end. The front end portion of the interior of the injection cylinder 85 is connected to the resin exit 91 of the plasticizing unit 10 via an inclined pipe-shaped resin passage portion 92. The rear end portion of the injection unit 73, including the support plate 83r, is connected to the bottom portion of the plasticizing unit 10. Reference numeral 93 denotes a clamping mechanism for supporting the mold 72.

The thus-configured preplasticization injection molding machine Mb operates in the following manner. At the beginning of measuring, the thrust generator 5 (FIG. 2) of the drive unit 2 is controlled so as to move the screw 6b forward. As a result, the valve portion 13 separates from the valve seat member 78 in order to open the resin passage 12. Next, the rotary motor 3 of the drive unit 2 is controlled so as to rotate the screw 6b. As a result, the molding material fed from the hopper 75 is plasticized and melted within the heating cylinder 11. The melted resin is discharged from the resin exit 91 of the heating cylinder 11 and is fed, via the resin passage portion 92, to the front end side of the injection cylinder 85 of the injection unit 73. The thus-fed resin is measured and accumulated within the injection cylinder 85.

During measuring, the injection plunger 87 retracts. When the melted resin is accumulated in a preset amount by means of measuring, the rotary motor 3 is stopped. Also, the thrust generator 5 of the drive unit 2 is controlled so as to move the screw 6b rearward. As a result, the valve portion 13 abuts the valve seat member 78 in order to close the resin passage 12. Subsequently, the injection unit 73 is driven and controlled. As a result, the injection plunger 87 advances in order to inject and charge the resin accumulated in the injection cylinder 85 into the cavity of the mold 72. Upon completion of the injection, the thrust generator 5 is controlled so as to move the screw 6b forward, thereby opening the resin passage 12. In this way, one molding cycle is completed, and then the same operation is repeated.

Figure 9:
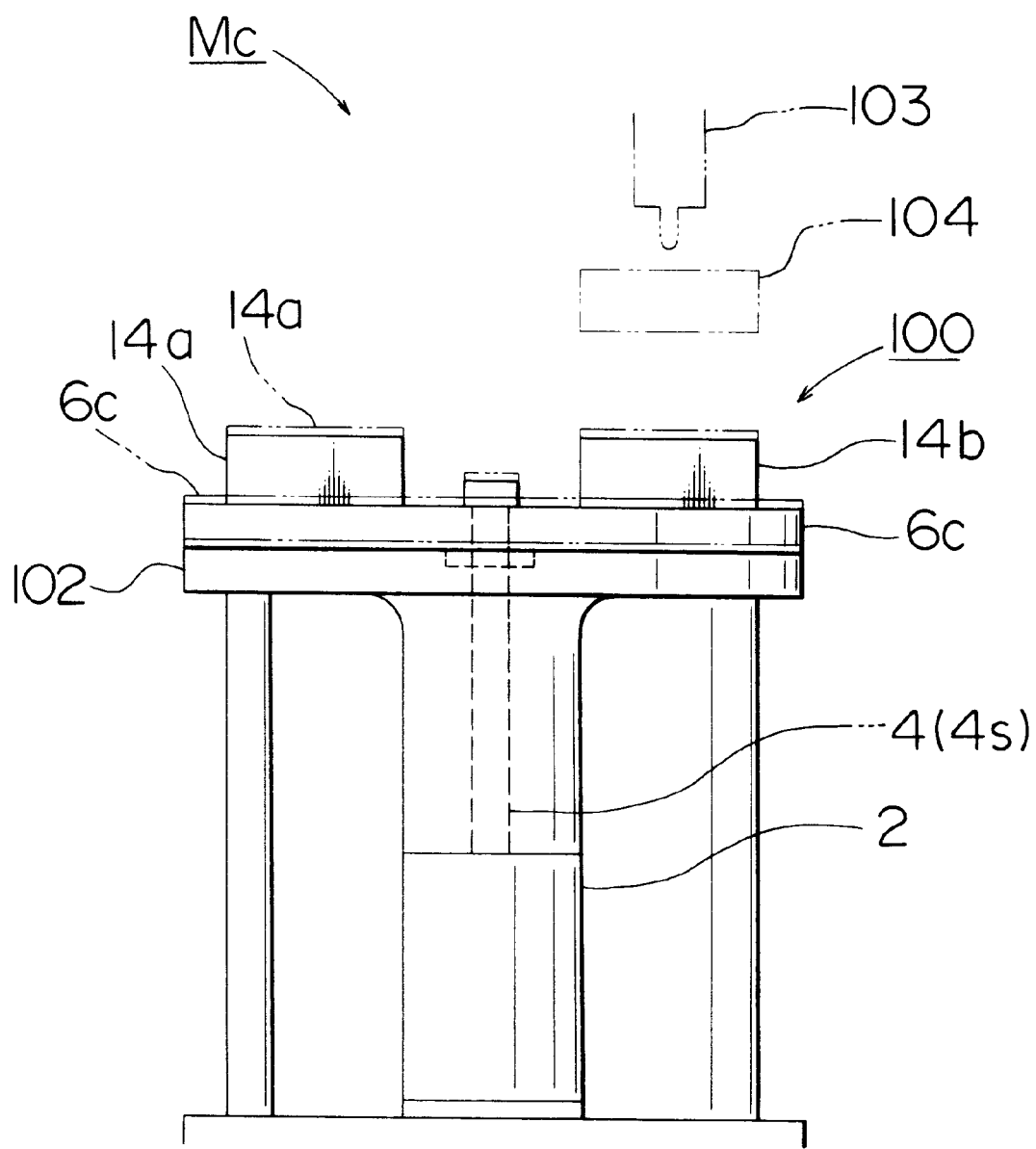
FIG. 9 is a view showing a molding machine (equipped with a rotary table mechanism) according to a third embodiment of the present invention.

Next, a molding machine Mc according to a third embodiment of the present invention will be described with reference to FIG. 9. The molding machine Mc of FIG. 9 has a rotary table mechanism 100. The tip end (output shaft portion 4s) of the shaft 4 of the drive unit 2 is connected to a mold exchange rotary table 6c (movable body 6) which supports a plurality of molds (stationary molds) 14a and 14b.

When the rotary table 6c is to be rotated, the thrust generator 5 (FIG. 2) of the drive unit is first controlled in order to advance (raise) the shaft 4 to thereby raise the rotary table 6c on a base 102 to a position indicated by an imaginary line. In this state, the rotary motor 3 (FIG. 2) is driven and controlled in order o rotate the rotary table 6c by, for example, 180° to thereby exchange the molds (stationary molds) 14a and 14b. In this case, the stop position of the molds (stationary molds) 14a and 14b may be detected by use of the rotary encoder 47 or a separately provided positional detector (e.g., separate encoder, or limit switch). After the rotation of the rotary table 6c is completed, the shaft 4 is retreated (lowered) in order to seat the rotary table 6c on the base 102. Numeral 103 denotes an injection unit, and numeral 104 denotes a movable mold. Although a vertical type molding machine is shown in FIG. 9, the drive unit of the present embodiment can be applied to a horizontal type molding machine.

Figure 10:
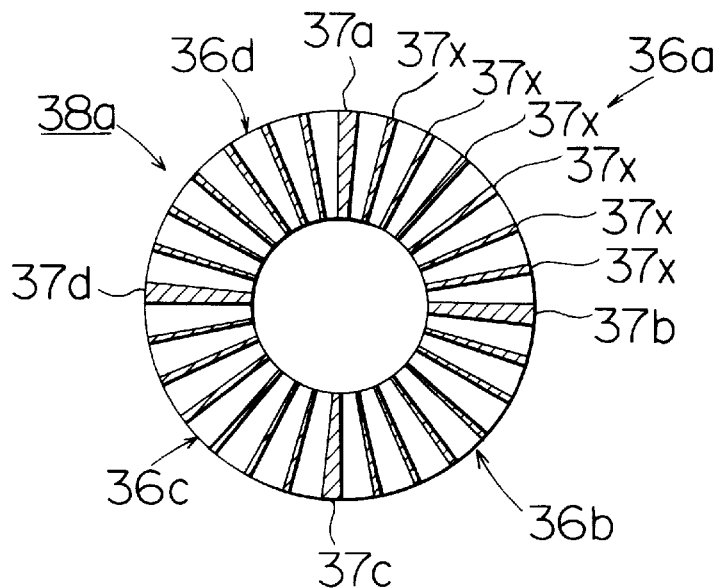
FIG. 10 is a sectional front view showing a modified embodiment of a four-pole rotor portion of FIG. 2.
Figure 11:
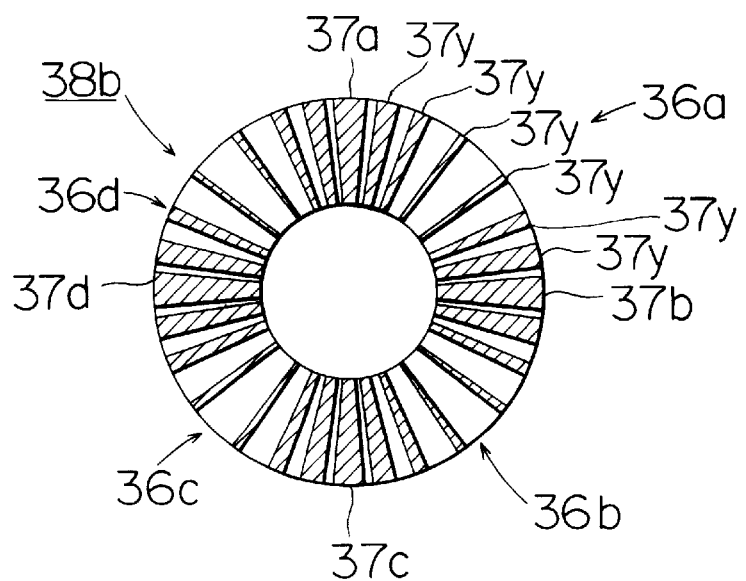
FIG. 11 is a sectional front view showing another modified embodiment of the four-pole rotor portion of FIG. 2.

FIGS. 10 to 16 show modified embodiments of the drive unit 2. FIGS. 10 and 11 show a modified embodiment of the four-pole rotor portion 38 of FIG. 3. In a rotor portion 38a of FIG. 10, the magnetic elements 36a to 36d, which extend along the direction of magnetic flux (along axis of rotation) generated by field coils, are further divided into sub magnetic elements in the direction of rotation by a plurality of subdividing non-magnetic elements 37x such that the sub magnetic elements are magnetically separated from each other. The degree of magnetic separation effected by the subdividing non-magnetic elements 37x is much smaller than that effected by the non-magnetic elements 37a to 37d. Specifically, when the circumferential thickness of (accommodation gap for) each of the non-magnetic elements 37a to 37d is about 3 to 10 mm, the circumferential thickness of each of the subdividing non-magnetic elements 37x is set to about 0.3 to 3 mm. Employment of the rotor portion 38a of such configuration eliminates the effect of magnetic flux, i.e., reaction of the armature, which would otherwise be induced by armature current.

In a rotor portion 38b of FIG. 11, the magnetic elements 36a to 36d, which extend along the direction of magnetic flux (along axis of rotation) generated by field coils, are further divided into sub magnetic elements in the direction of rotation by a plurality of non-magnetic elements 37y such that the sub magnetic elements are magnetically separated from each other, as in the case of the rotor portion 38a of FIG. 10. However, the rotor portion 38b differs from the rotor portion 38a in that the sub magnetic elements have different thicknesses in the direction of rotation so as to correspond to sine-wave-shaped distribution density of magnetic flux induced from a field core. Specifically, in the rotor portion 38b, the magnetic elements 36a to 36d are further divided into sub magnetic elements in the direction of rotation by the non-magnetic elements 37y such that sub magnetic elements located at a central portion of each of the magnetic elements 36a to 36d are relatively thick while those located in the vicinity the non-magnetic elements 37a to 37d are relatively thin. In this manner, thicknesses of the sub magnetic elements are circumferentially arranged according to the sine-wave-shaped magnetic flux distribution density. Through employment of such configuration, the rotor portion 38b enables formation of magnetic poles (north and south poles) on the outer circumferential surface thereof in correspondence with sine-wave-shaped magnetic flux distribution induced by field current, thereby significantly improving a rotation characteristic.

Figure 12:
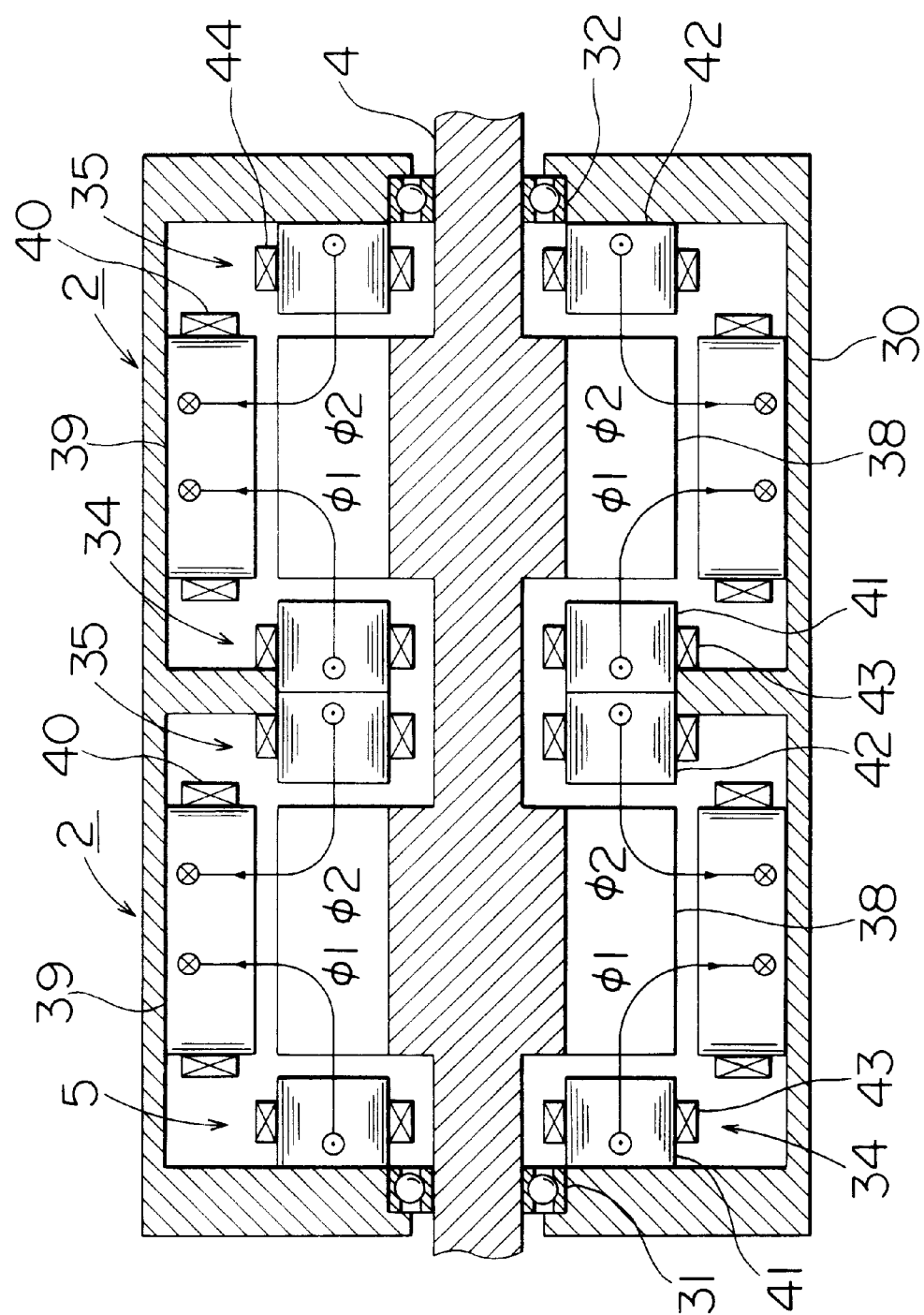
FIG. 12 is a sectional side view showing a modified embodiment of the drive unit of FIG. 2.

FIG. 12 shows a modified embodiment of the drive unit 2 of FIG. 2, exemplifying a series connection of two drive units 2. However, three or more drive units 2 may be connected in series. In FIG. 12, the same features as those of FIG. 2 are denoted by common reference numerals for clarification. Through series connection of a plurality of drive units 2, thrust and torque that can be controlled can be increased with the number of drive units 2 connected.

Figure 13:
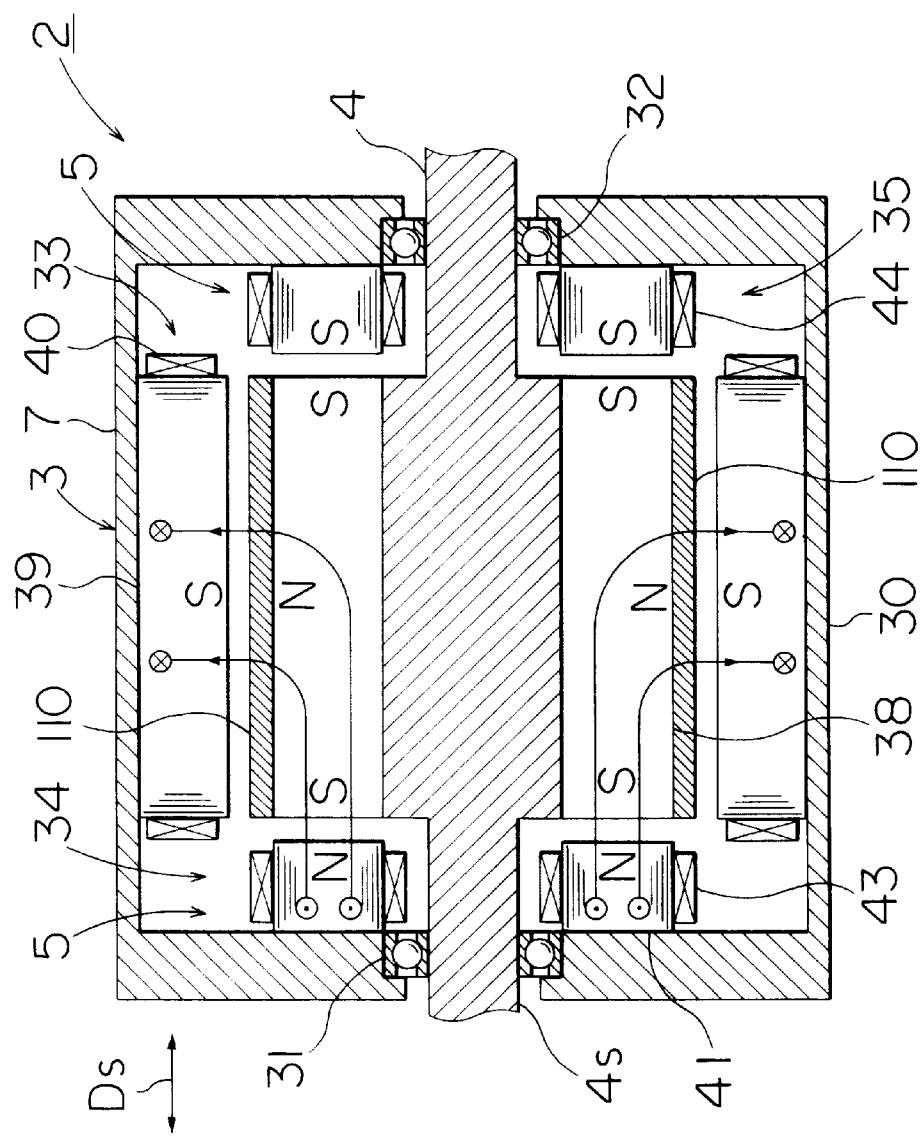
FIG. 13 is a sectional side view showing another modified embodiment of the drive unit of FIG. 2.

FIG. 13 shows another modified embodiment of the drive unit 2 of FIG. 2. In the rotor portion 38 of FIG. 13, a permanent magnet 110 of a cylindrical strip shape (a strip portion cut out from a cylinder) is attached to the outer circumferential surface of each of the magnetic elements 36a to 36d. The permanent magnets 110 attached to the magnetic elements 36a and 36c are polarized such that the north pole is induced on the inner side in contact with the rotor portion 38 and the south pole is induced on the outer side facing the armature portion 33. Further, the north pole is induced on the end faces of the magnetic elements 36a and 36c which face the field portions 34 and 35. Similarly, the permanent magnets 110 attached to the magnetic elements 36b and 36d are polarized such that the south pole is induced on the inner side in contact with the rotor portion 38 and the north pole is induced on the outer side facing the armature portion 33. Further, the south pole is induced on the end faces of the magnetic elements 36b and 36d which face the field portions 34 and 35.

In the present modified embodiment, the field portions 34 and 35 are excited by field currents which differ in phase angle by 90°. Specifically, as shown in FIG. 13, when the field portion 34 is excited to assume the north pole, the field portion 35 is excited to assume the south pole. By contrast, when the field portion 34 is excited to assume the south pole, the field portion 35 is excited to assume the north pole. As a result, repulsive force is generated between the rotor portion 38 and the field portion 35, whereas attractive force is generated between the rotor portion 38 and the field portion 34. At this time, if the rotor portion 38 is in contact with or is located in the vicinity of the field portion 34 or 35, attractive force (thrust) induced by the permanent magnet 110 can be maintained without application of excitation current. Notably, position control and thrust control of the shaft 4 effected in axial direction Ds can be performed by controlling field currents IfL and IfR as mentioned previously. The modified embodiment of FIG. 13 may also employ a series connection of a plurality of drive units 2 in order to obtain larger torque and thrust as in the case of FIG. 12.

In the modified embodiment of FIG. 13, the permanent magnets 110 are attached onto the outer circumferential surfaces of the magnetic elements 36a to 36d, so that the rotor portion 38 can be rotated even when no field current is applied to field coils. In this case, since torque depends on the intensity of the magnetic poles of the permanent magnets 110 and the magnitude of armature current, optimum torque control cannot be performed over a wide range of torque. However, there can be configured the rotor portion 38 of hybrid type in which, in addition to the presence of magnetic flux induced from the permanent magnets 110, the magnitude of magnetic flux induced from field coils is appropriately controlled through control of the magnitude of current flowing through the field coils to thereby control the intensity of magnetic poles. In FIG. 13, the same features as those of FIG. 2 are denoted by common reference numerals for clarification.

Figure 14:
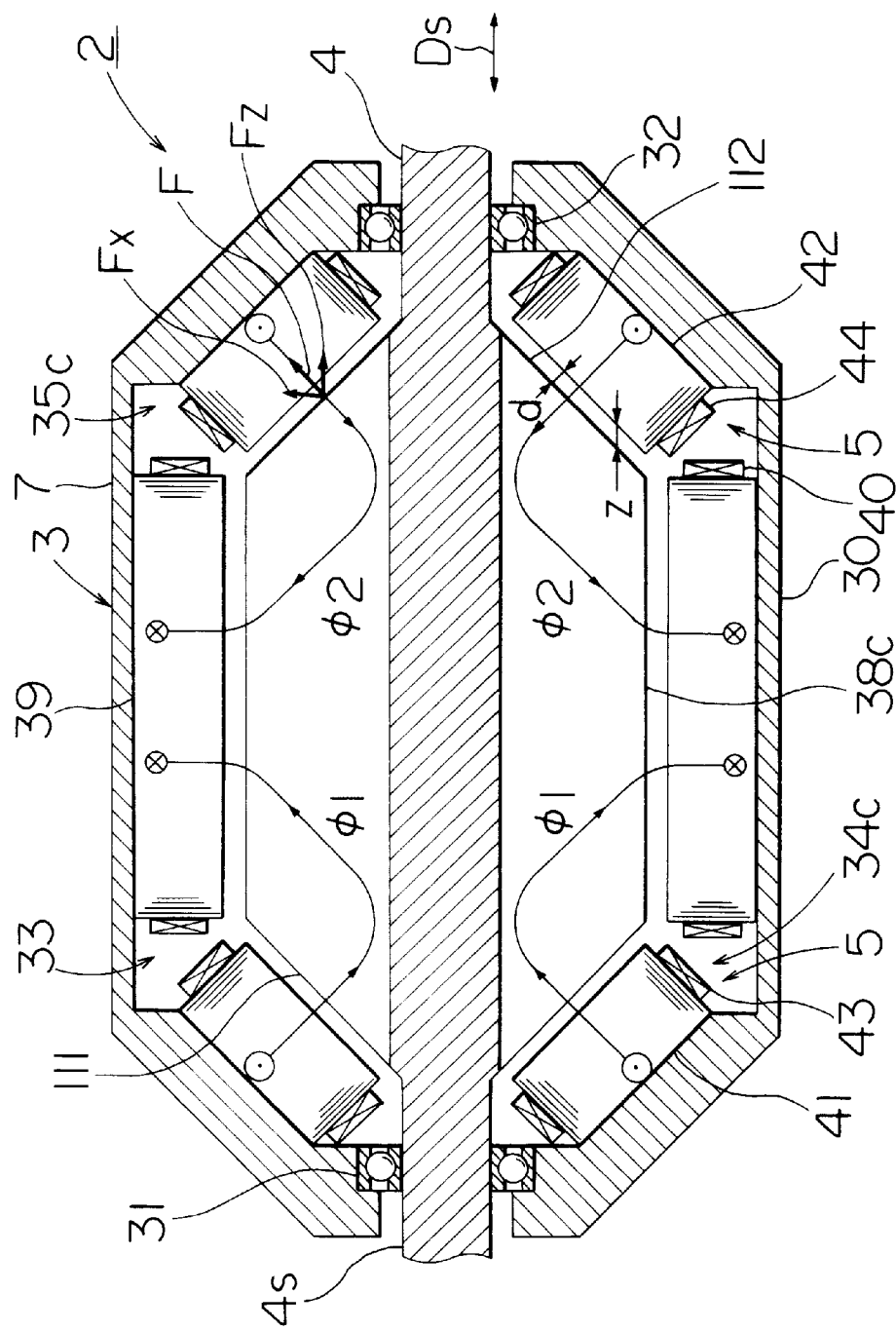
FIG. 14 is a sectional side view showing still another modified embodiment of the drive unit of FIG. 2.
Figure 15:
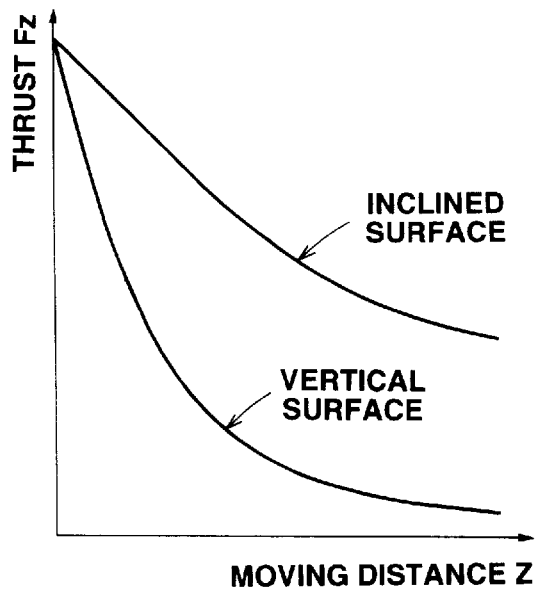
FIG. 15 is a characteristic diagram showing the relationship between axial moving distance of the rotor portion and thrust with respect to the drive units of FIGS. 2 and 14.

FIG. 14 (FIG. 15) shows still another modified embodiment of the drive unit 2 of FIG. 2. In a rotor portion 38c of FIG. 14, opposite end faces are inclined at a predetermined angle with respect to the shaft 4, thereby forming inclined surfaces (e.g. tapered surfaces) 111 and 112. Field portions 34c and 35c are geometrically configured so as to face the inclined surfaces 111 and 112, respectively, in parallel. As a result, a moving distance z of the shaft 4 in axial direction Ds becomes greater than a gap d on a magnetic circuit between the rotor portion 38c and the field portion 34c (35c); i.e., the relation "z>d" is established. Since the small gap d secures the moving distance z longer than the gap d, excitation current can be reduced, and also a thrust characteristic can be improved. FIG. 15 shows the relationship between moving distance z and thrust Fz with respect to the embodiment of FIG. 2 in which the end faces of the rotor portion 38 are perpendicular to the shaft 4 and the modified embodiment of FIG. 14 in which the end faces of the rotor portion 38c assume the form of inclined surfaces 111 and 112. As seen from FIG. 15, in the case where the end faces of the rotor portion 38 are perpendicular to the shaft 4, thrust Fz decreases abruptly with moving distance z. By contrast, in the case where the inclined surfaces 111 and 112 are employed, even when moving distance z increases, a reduction in thrust Fz is smaller than in the case of the vertical end faces. Thrust Fz decreases gently with moving distance z. This is because, with a given value of gap d, moving distance z in the case of the inclined surfaces 111 and 112 becomes longer than that in the case of the vertical end faces.

In the present modified embodiment, attractive force F acting between the rotor portion 38c and the field portions 34c and 35c is generated perpendicular to the end faces, i.e., the inclined surfaces 111 and 112, of the rotor portion 38c. This attractive force F is divided into component forces Fz (thrust) directed in the axial direction and component forces Fx directed in radial directions. Component forces Fz directed in radial directions cancel each other, whereas component forces Fz (thrust) directed in the axial direction are directed in the same direction. The magnitude of component forces Fz is substantially identical to that in the case where the end faces of the rotor portion 38c are perpendicular to the shaft 4. Accordingly, through control of the magnetic fluxes Φ1 and Φ2 induced by the field portions 34c and 35c, respectively, magnetic bearings functioning in the axial and radial directions can be implemented. In FIG. 14, the opposite end faces of the rotor portion 38c are formed into the inclined surfaces 111 and 112. However, one end face of the rotor portion 38c may be formed into an inclined surface.

Figure 16:
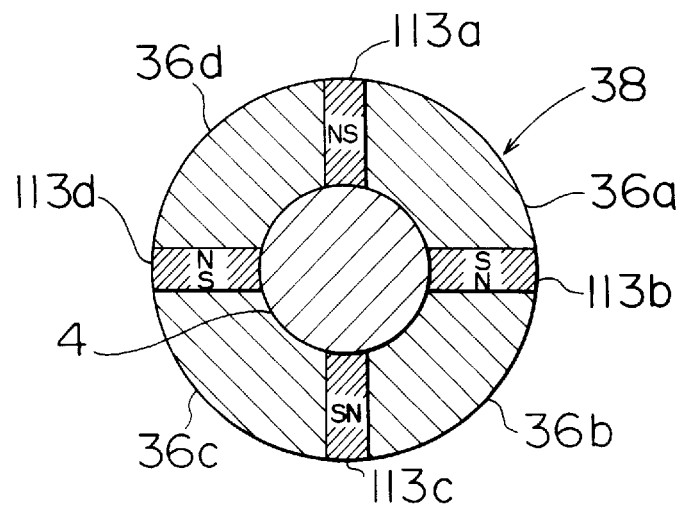
FIG. 16 is a sectional front view showing still another modified embodiment of the four-pole rotor portion of FIG. 2.

FIG. 16 shows a modified embodiment of the rotor portion 38 of FIG. 2. The rotor portion 38 of FIG. 16 employs permanent magnets 113a to 113d instead of the non-magnetic elements 37a to 37d in order to separate the magnetic elements 36a to 36d from each other. The permanent magnets 113a to 113d are arranged such that the south pole faces the magnetic elements 36a and 36c while the north pole faces the magnetic elements 36b and 36d.

The present invention is not limited to the above-described embodiments. Regarding structural details, shape, and any other features, modifications and any omission or addition may be possible as needed without departing from the scope of the invention.

Figure 4:
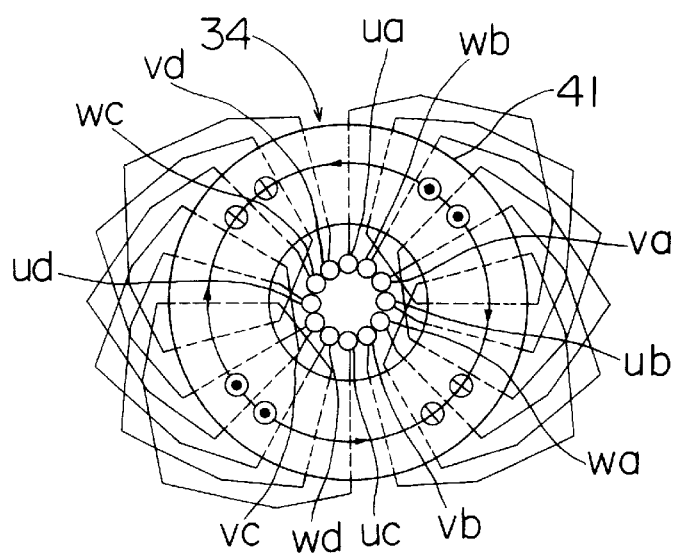
FIG. 4 is a diagram showing the principle of a field portion as viewed along line B—B of FIG. 2.

For example, molding machines to which the present invention is applied are not limited to those of the above embodiments, but the invention may be applied to any other molding machines. The thrust generator is housed within the casing in the above embodiments, but may be provided outside the casing. The embodiments of FIGS. 2 and 14 are described while mentioning the field portions provided on the opposite sides of the rotor portion. However, the field portion may only be provided on one side of the rotor portion. This may also be applied to the case of the embodiment of FIG. 12 where the drive units are connected in series. When the field portion is only provided on one side of the rotor portion, an elastic member, such as a spring, may be employed in order to reset the rotor portion toward the opposite side. The shaft of FIG. 2 or 14 may only be supported at one end by bearing. Particularly, in the case of FIG. 14, since attractive force is acting in radial directions, the force produces a bearing effect. Further, the above embodiments are described while mentioning a synchronous motor with four poles and 24 slots or with two poles and 12 slots. However, the number of poles and the number of slots are not limited thereto, but may be combined optionally. The embodiment of FIG. 4 is described while mentioning field coils of single-layer lap winding. However, the invention is not limited thereto, but double-layer lap winding may be employed. Further, the above embodiments are described while mentioning an inner rotor type in which the rotor portion is located inside the armature portion. However, the invention is not limited thereto, but an outer rotor type in which the rotor portion is located outside the armature portion may be employed.

What is claimed is:

1. A molding machine including a movable body and a drive unit comprising:
    a rotary motor having a shaft that is rotatable and axially movable;
    a thrust generator for axially moving the shaft;
    the shaft being connected to the movable body in order to allow the movable body to be rotated by the rotary motor and be reciprocated by the thrust generator;
    a stator frame serving as a casing;
    an armature portion disposed along an inner circumferential surface of the stator frame;
    a field portion disposed on each of the inner surfaces of front and rear end walls of the stator frame; and
    a rotor portion provided on the shaft supported by the stator frame and including magnetic elements and non-magnetic elements arranged alternately in a circumferential direction.

2. A molding machine according to claim 1, wherein the thrust generator is provided within a casing of the rotary motor.

3. A molding machine according to claim 1, wherein the drive unit controls torque and thrust through variable control of the magnitude of field current flowing through the field portion.

4. A molding machine according to claim 1, wherein the magnetic elements of the rotor portion are each circumferentially subdivided in a magnetically separated manner by a plurality of subdividing non-magnetic elements.

5. A molding machine according to claim 4, wherein the subdividing non-magnetic elements differ in thickness as measured in a circumferential direction so as to correspond to sine-wave-shaped distribution density of magnetic flux induced from the field portion.

6. A molding machine according to claim 1, wherein the magnetic elements of the rotor portion each have a permanent magnet provided on an outer circumferential surface.

7. A molding machine according to claim 1, wherein the rotor portion employs permanent magnets in place of the non-magnetic elements.

8. A molding machine according to claim 1, wherein the front and rear end faces of the stator frame are formed perpendicular to the shaft.

9. A molding machine according to claim 1, wherein one or both of the front and rear end faces of the stator frame are inclined with respect to the shaft.

10. A molding machine according to claim 1, wherein the molding machine includes at least two of the drive units, connected in series.

11. A molding machine according to claim 1, wherein the drive unit further comprises a pressure detection unit for detecting pressure of the movable body in a reciprocating direction of the movable body and a pressure control unit for controlling the pressure of the movable body by controlling the thrust generator on the basis of a detected pressure value obtained from the pressure detection unit and a previously set pressure value.

12. A molding machine according to claim 1, wherein the drive unit further comprises a position detection unit for detecting position of the movable body in a reciprocating direction of the movable body and a position control unit for controlling the position of the movable body by controlling the thrust generator on the basis of a detected position value obtained from the position detection unit and a previously set position value.

13. A molding machine according to claim 1, wherein the drive unit further comprises a speed detection unit for detecting speed of the movable body in a reciprocating direction of the movable body and a speed control unit for controlling the speed of the movable body by controlling the thrust generator on the basis of a detected speed value obtained from the speed detection unit and a previously set speed value.

14. A molding machine according to claim 1, wherein the movable body is a screw employed in an in-line screw injection molding machine.

15. A molding machine according to claim 1, wherein the movable body is a screw which is accommodated in a heating cylinder of a plasticizing unit of a preplasticization injection molding machine and which includes a valve for opening/closing a resin passage formed in the heating cylinder.

16. A molding machine according to claim 1, wherein the movable body is a mold exchange rotary table which supports a plurality of molds.

* * * * *